June 18, 1963  W. ENGI  3,094,290
MILL FOR COFFEE, SPICES, NUTS AND THE LIKE
Filed Jan. 5, 1962  3 Sheets-Sheet 1
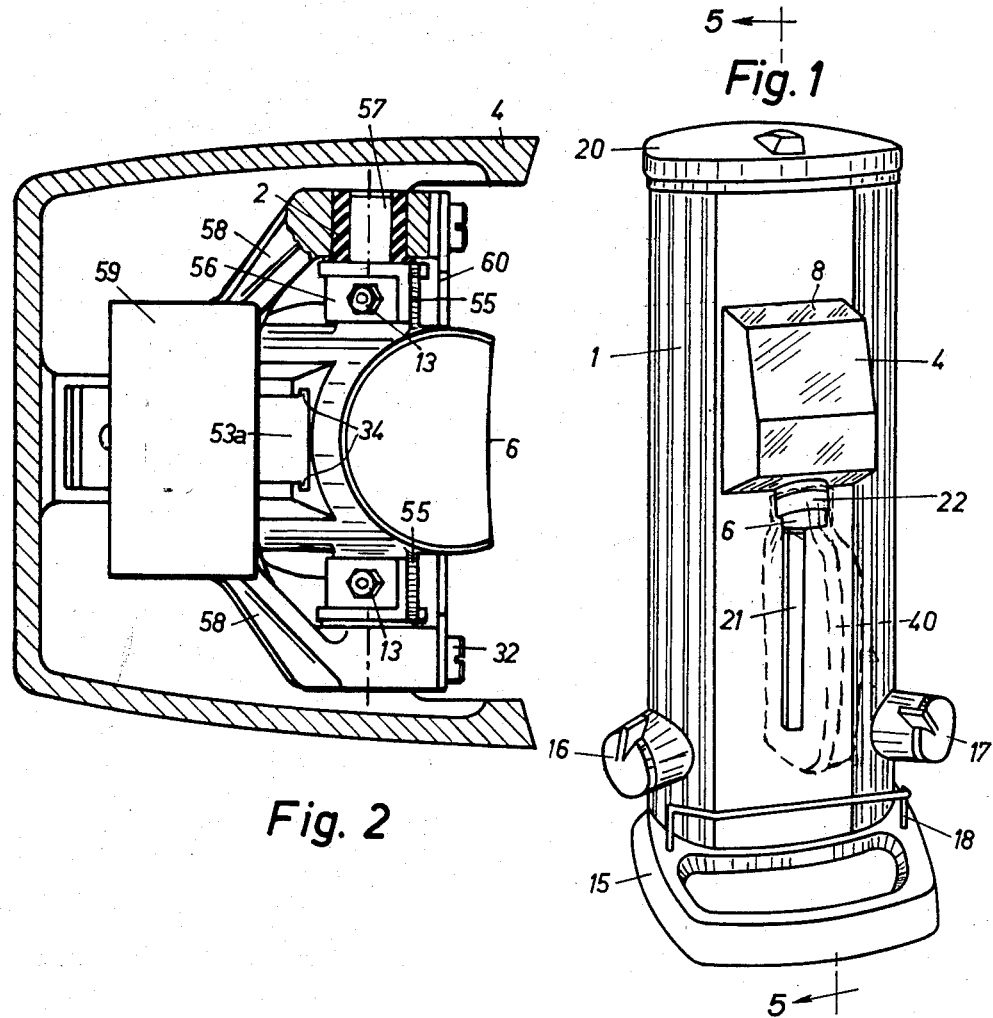
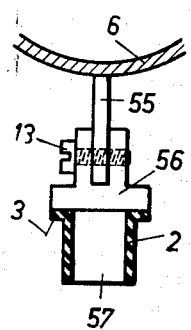
INVENTOR.
Walter Engi
BY

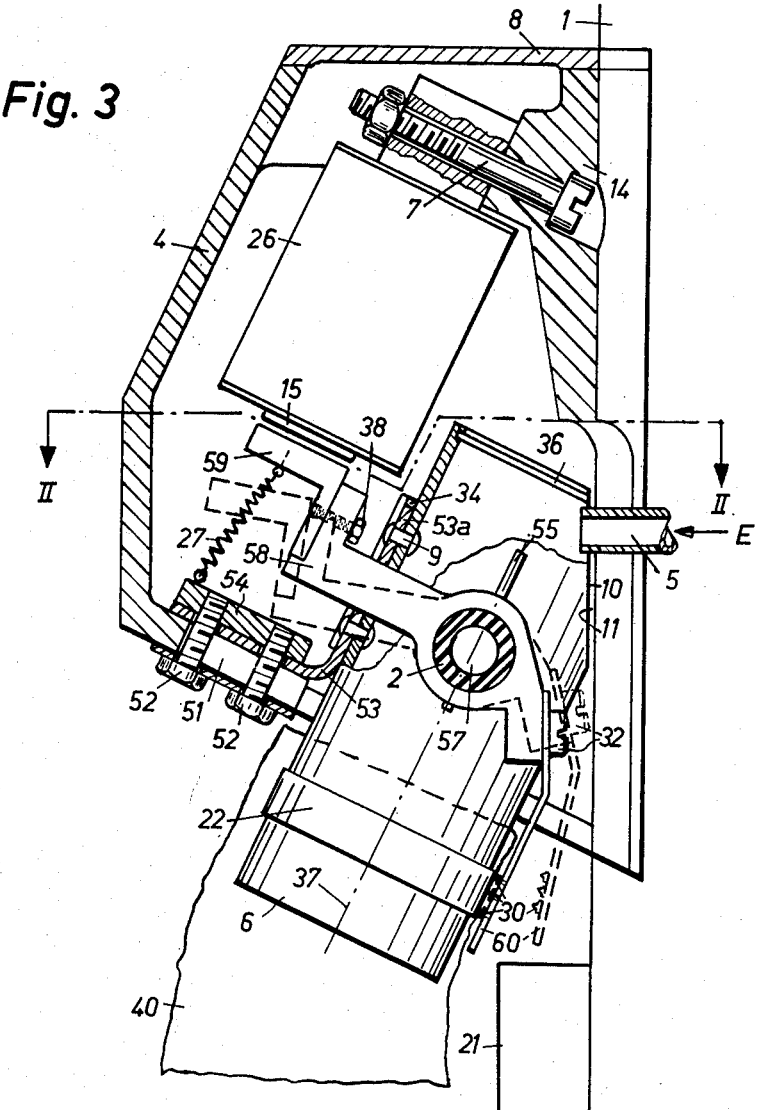

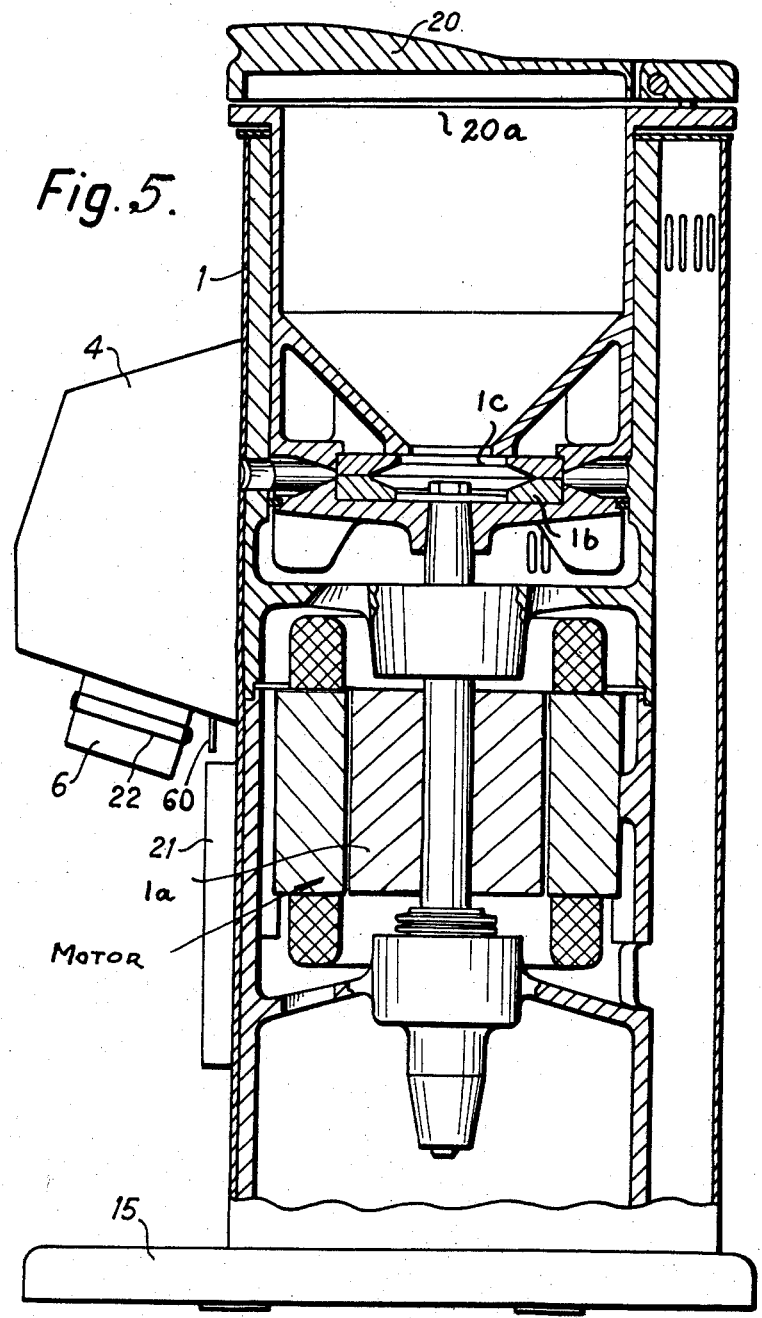

United States Patent Office 3,094,290
Patented June 18, 1963

3,094,290
MILL FOR COFFEE, SPICES, NUTS
AND THE LIKE
Walter Engi, Zurich, Switzerland, assignor to
Adolf Ditting
Filed Jan. 5, 1962, Ser. No. 164,512
Claims priority, application Switzerland Jan. 10, 1961
6 Claims. (Cl. 241—100)

This invention relates to a motor driven grinder and more particularly to a spout construction of a mill for coffee, spices, nuts and the like.

A first object of the present invention is the provision of means which permits the conveying of ground coffee or the like from the grinding discs of the mill to a container, such as a paper bag, with a minimum amount of ground particles being retained in the spout.

A further object of the invention is the provision of means in a spout construction of a grinder which prevent the ground coffee or any other ground material from adhering to the internal walls as a result of electrostatic charge.

Still a further object of the invention is to provide means to shake the container, such as a bag for the ground material. It is well known that the ground material occupies a larger volume than the granular material, so that when using the same bag for the granular material and the ground material—as is usual practice—the bag is filled almost up to the upper edge, some of the ground material accumulating in the lower tube section of the discharge tube. As a result of the vibrations the ground material in the bag is somewhat compressed and consequently it is avoided that the ground material extends into the outlet end of the discharge tube on completing the grinding process, whereby a spilling of the ground material on removing the bag is substantially avoided.

It is another object of the invention to provide means contributing to a simplified and facilitated operation of the machine so that it can be used in self-service shops, in which the mill is no longer operated by the sales staff but by the purchasing public.

These and other objects of the invention will become more apparent from the following description, taken in connection with the accompanying drawings in which:

FIG. 1 is a perspective view of the entire mill,
FIG. 2 is a cross-section through the vibrating and bag-clamping device of the mill along the line II—II,
FIG. 3 is a longitudinal section through the vibrating and bag-clamping device,
FIG. 4 is a detail of the securing means of the discharge tube,
FIG. 5 is a vertical sectional view indicated by line 5—5 on FIG. 1.

The invention is hereinafter described by reference to a coffee mill. The housing 1 of this mill is of elongated, vertical form, inside which is installed an electric motor (FIG. 5), the rotor 1a of which is rotated about a vertical axis. The rotor drives a grinding disc, which cooperates with a further, but stationary grinding disc 1b. The material to be ground is introduced into the mill through a top opening 20a, after swinging up the cover 20. Located near the bottom end of the mill is a switch 16 for switching the driving motor on and off. A handle device 17 serves for setting the fineness of the grinding. A stirrup member 18 is also provided on the front of the mill, near the bottom end thereof. Rigidly fixed in the upper half of the mill housing is a support or housing part 4, inside which is disposed a solenoid 26, an electromagnet or a coil, being inclined relatively to the vertical axis of the mill housing and being fixed by means of screws 7 to a rear wall portion 14 adjacent the mill housing 1. The solenoid 26 acts as a vibration generator and is rectangular in cross-section and adapted to be connected to the normal alternating current mains. The housing part 4 is closed at its upper end by a removable cover 8 and comprises at the bottom end an opening, into which projects an inclined discharge tube 6 for the ground material to be delivered. The discharge tube 6 is fixed by means of a spring 53 to the lower sloping wall part of the housing 4. Serving for this purpose is a slot 51, into which project two fixing screws 52. These screws being screwed into a clamping plate 54 and between this clamping plate 54 and the housing wall is the spring 53 clamped, which is bent over at right-angles. The upper arm 53a of this leaf spring 53 projects obliquely upwards into the interior of the housing part 4 and is held in the tube 6 in a guide groove 34 by rivets 9 or the like. The mounting is effected in such a way that the discharge tube 6 is spaced somewhat from the housing of the mill 1, so that it can vibrate and oscillate freely. The upper part of the discharge tube 6 is provided with a bevelling 10, so that a parabolic opening is formed in the wall of this tube 6. The upper end of the discharge tube 6 is closed by a cover 36. The space 11 remaining between the bevelled portion of the discharge tube 6 and the mill housing could also be sealed off by a soft rubber ring or the like which leaves the tube 6 opening free, so that the tube can still easily be vibrated. On the outside of the tube 6 two outwardly projecting lugs 55 are disposed diagonally opposite one another. They extend parallel to the longitudinal axis 37 of the discharge tube, each of these lugs having a bearing member 56 screwed thereon. As shown in FIG. 4, each of these bearing members 56 comprises a cylindrical bolt 57, the axis of which is arranged transversely of the longitudinal axis 37 of the discharge tube 6. These bolts 57 serve to accommodate a stirrup-shaped rocker member 58 which is formed as a two-armed lever and which carries a pole piece 59 on one side and a bag-clamping device 60 on the other side. Each of the two bearing members 56 is formed with a slot, which is engaged by one lug 55 of the tube 6. Each lug being held in the assembled position by a screw and nut 13. The rocker member 58 is a single piece and the angle-shaped pole piece 59 is fixed thereon by screws 38. A bag-clamping lever or plate 60, formed as half of a circular ring, is secured on the said rocker member 58 by means of screws 32. Said plate being slightly cranked in the region of the points of attachment to the rocker member. Mounted on the tube 6 near the lower end is a rubber ring 22, which projects radially somewhat beyond the wall of the tube 6. A number of teeth 30 are formed in the bag-clamping plate 60 at those points on the latter which co-operate with the rubber ring 22 and are directly opposite the latter, so that the tips of said teeth can penetrate into a container, such as a paper bag 40 which is to be held and into the rubber ring 22. In this way, the rocker member is adapted to pivot together with the bag-clamping plate 60 about the bolts or pins 57.

For sound-damping purposes, a rubber ring 2 is placed between each of the pivot pins 57 and the holes in the rocker member 58. Said rings 2 each being provided with a flange-like radial extension 3. This extension 3 thus lies between the radial extension of the bearing member 56 and the opposite surface of the rocker member 58. Instead of using rubber as material for the ring 2, the latter could for example consist of plastic material or like soft material.

The dimensions of the rocker member 58 and its arrangement in association with the bag-clamping plate 60 are so chosen that the pole piece 59, in the position attracted by the electromagnet, does not quite contact the core 15 of the solenoid 26. It has been found that the best conditions of vibration are set up if the spacing between the pole piece and the armature is about 1/10 inch, when the said pole piece is lightly pressed manually towards the solenoid if the latter is not energised. One end of a weak spring 27 is anchored to the pole piece 59, the other end of the spring being secured in an eye on the clamping plate 54, so that therefore the rocker member, when the solenoid is not energised, reaches the rest position shown in broken lines in FIG. 3, on the one hand under the action of gravity and on the other hand under the action of this spring 27.

As will be seen best in FIGS. 1 and 3, a guide bar 21 is provided just behind and below the tube 6, the said bar extending vertically and being secured to the mill housing 1.

When using the mill, the materials to be ground, for example coffee, nuts, spices and the like, are emptied into the mill from a paper bag in which these materials are normally kept. The paper bag or the like is then pushed along the guide bar 21 over the discharge tube 6 with the opening uppermost. The bag-clamping plate 60 is at this time situated behind the bag, that is to say, the paper bag lies between the plate 60 and the outer wall of the tube 6. Thereupon the motor switch 16 is actuated, which has the effect of rotating the motor of the mill and of providing alternating current to the solenoid 26. Instead of arranging switch 16 in the circuit of the driving motor of the mill, so that the motor is switched on and simultaneously the solenoid 26 is supplied with current it is possible to provide two independent switches.

As a consequence, the solenoid 26 pulls up the pole piece 59, whereby the rocker member 58 together with the bag clamping plate 60 are moved to the positions shown in full lines in FIG. 3. As a result, the points or teeth 30 are pressed against the bag 40 and produce a clamping of this bag on the rubber ring 22 so that the bag hangs freely from said tube 6. Under the influence of the solenoid 26 energised by alternating current, the rocker member 58 starts to vibrate, since the pole piece 59 is periodically attracted and displaced slightly away from the solenoid in a manner known per se. The arrangement is such that when the magnet is energised, the pole piece 59 does not contact the armature 15, wereby noises are substantially avoided. On the other hand, the pressure applied by the plate 60 to the bag 40 is so strong, that the weight of bag in filled condition (1 pound or more) usually provided can easily be supported. The lever arm ratios of the rocker member 58 are therefore so chosen that the lever arm between the longitudinal axis 37 of the tube 6 and that part of the bag-clamping plate 60 which becomes operative is smaller than the lever arm of the rocker member 58 between this axis 37 and the middle of the pole piece 59. The oscillatory movements of the rocker member 58 are transmitted through the bag-clamping plate 60, which only has a slight springing action, to the discharge tube 6, which thereby has a constant vibration imparted to it. This vibration has the effect that the ground material, which passes from the grinding disc of the mill and by way of a supply tube 5 in the direction of the arrow E (FIG. 3) into the discharge tube 6, can no longer be deposited on the walls of the tube because of the constant vibrations and falls into the paper bag 40 or the like.

The effect produced by the vibrations transmitted from the tube 6 to the bag 40 is that the ground material is slightly compressed. This is highly desirable, because otherwise the ground material, which usually is discharged again into the same bag as that which contained the granular unground material, would occupy a larger volume, with the result that on completion of the grinding process, some of the ground material remains in the discharge tube 6, which is easily spilled on removing the bag 40. Due to the constant vibrations of the freely swinging bag 40, there is produced a slight shaking movement during the entire grinding process, so that the space occupied by the ground material is usually only slightly larger than that which is occupied by the unground material. By switching off the supply of current to the motor and the solenoid 26, the rocker member 58 returns to its rest position, whereby the bag is released and can be removed. In order that the bag does not tip over, this is held by the stirrup member 18 after the bag drops off the tube 6, should the bag by way of exception not be held by hand.

Various changes and modifications may be made without departing from the spirit and scope of the present invention and it is intended that such obvious changes and modifications be embraced by the annexed claims.

Having thus described the nature of the present invention what is desired to be secured by United States Letters Patent, is:

1. In combination; a mill for grinding coffee, spices, nuts and the like, a spout construction mounted on the mill, and mill comprising a housing with a discharge opening and said spout construction comprising support means rigidly connected to said housing, an electromotor in said housing, a discharge tube leading downwardly from said discharge opening for converging the ground material from the mill, said tube having an aperture adjacent said discharge opening to receive ground material therefrom, resilient means connected between said support means and said tube supporting said tube, said tube being slightly spaced from said housing to permit the discharge tube to vibrate, electromagnetic means influenced by alternating current adapted for co-operating with said tube, so that said tube can be set in vibration by closing an electrical switch in circuit with said electromagnetic means and thereby set the tube in vibration to dislodge therefrom any ground material adhering to the inside of the tube, a pivotally arranged clamping arm arranged near said tube, said clamping arm being influenced by said electromagnetic means for clamping a bag for receiving the ground material discharged from said tube during energizing the electromagnetic means.

2. In combination; a mill for grinding coffee, spices, nuts and the like, a spout construction mounted on the mill, said mill comprising a housing with a discharge opening and said spout construction comprising support means rigidly connected to said housing, an electromotor in said housing, a discharge tube leading downwardly from said discharge opening for converging the ground material from the mill, said tube having an aperture adjacent said discharge opening to receive ground material therefrom, resilient means connected between said support means and said tube supporting said tube, said tube being slightly spaced from said housing to permit the discharge tube to vibrate, an electromagnet fixed to said support means, said electromagnet being influenced by alternating current, a pivotally mounted member with two lever arms, said lever arms extending in opposite directions from the length-axis of said tube, one end of one of said lever arms cooperating with said electromagnet, one end of the other lever arm cooperating with the mantle of said tube for clamping a container by energizing of the electromagnet.

3. The combination according to claim 2, in which said pivotally member is mounted on the discharge tube.

4. The combination according to claim 1, in which said vibrations generator is an electromagnet influenced by alternating current, a combined switch for said electromotor and said vibrator.

5. A spout construction for coffee mills and the like, said spout construction comprising support means adapted for rigid connection to the housing of a mill, an inclined discharge tube carried by the support means, said discharge tube being adapted for having its upper end positioned in closely spaced relation to the mill to receive ground material therefrom, means for movably holding said tube on said support means to permit said tube to vibrate, an electromagnet fixed to said support means, said electromagnet being influenced by alternating current, a rocker member with a first lever arm and a second lever arm, said rocker member being pivotably mounted on said tube, the end of said first lever arm cooperating with said electromagnet and the end of said second lever arm cooperating with a clamping device for a bag.

6. A spout construction according to claim 5, wherein said first lever arm is longer than said second lever arm.

References Cited in the file of this patent

UNITED STATES PATENTS

| | | |
|---|---|---|
| 2,044,326 | Pickell | June 16, 1936 |
| 2,118,182 | Flint | May 24, 1938 |
| 2,376,810 | Richardson | May 22, 1945 |
| 2,953,282 | Peterson | Sept. 20, 1960 |
| 3,021,984 | Engi | Feb. 20, 1962 |

FOREIGN PATENTS

| | | |
|---|---|---|
| 1,083,173 | Germany | June 9, 1960 |